(12) United States Patent
Minelli et al.

(10) Patent No.: US 8,646,825 B2
(45) Date of Patent: Feb. 11, 2014

(54) OVERHEAD CONSOLE WITH STORAGE UNIT INSERT

(75) Inventors: Mark Minelli, Dexter, MI (US); Eric Day, Ypsilanti, MI (US); Lynelle Harrison, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/362,627

(22) Filed: Jan. 31, 2012

(65) Prior Publication Data

US 2013/0193706 A1    Aug. 1, 2013

(51) Int. Cl.
*B60R 7/04* (2006.01)

(52) U.S. Cl.
USPC ........................................................ 296/37.7

(58) Field of Classification Search
USPC ........................................................ 296/37.7
IPC ......................................................... B60R 11/02
See application file for complete search history.

(56) References Cited

U.S. PATENT DOCUMENTS

| 4,867,498 | A | * | 9/1989 | Delphia et al. ............... 296/37.7 |
| 5,174,621 | A | * | 12/1992 | Anderson ........................ 296/70 |
| 7,182,383 | B2 | | 2/2007 | Anderson et al. |
| 7,363,148 | B1 | * | 4/2008 | Laverick et al. ............... 701/538 |
| 7,380,852 | B2 | * | 6/2008 | Vander Kuyl et al. ..... 296/24.34 |
| 7,413,229 | B2 | | 8/2008 | Kukucka et al. |
| 2005/0093321 | A1 | | 5/2005 | MacWilliam et al. |
| 2006/0185931 | A1 | * | 8/2006 | Kawar .......................... 181/202 |
| 2007/0108788 | A1 | * | 5/2007 | Shalam et al. ............. 296/37.15 |
| 2007/0247861 | A1 | * | 10/2007 | Tiesler et al. ................. 362/488 |

FOREIGN PATENT DOCUMENTS

JP     2000142261 A   *  5/2000

\* cited by examiner

*Primary Examiner* — Dennis Pedder
*Assistant Examiner* — Beverly Becker
(74) *Attorney, Agent, or Firm* — Gifford, Krass, Sprinkle, Anderson & Citkowski, P.C.

(57) ABSTRACT

The present disclosure provides an overhead console for a motor vehicle that can firmly hold, store and allow viewing of a portable electronic device. The overhead console can include a sunglass storage bin that is pivotally attached to an overhead console storage structure, the sunglass storage bin having a closed position and an open position. The console can also include a storage unit insert that is attached to and located at least partially within the sunglass storage bin. The storage unit insert can be dimensioned to hold a portable electronic device within the sunglass storage bin and allow the device to be stored out of view when the sunglass storage bin is in the closed position and allow viewing of the electronic device when the sunglass storage bin is in the open position.

12 Claims, 3 Drawing Sheets

OVERHEAD CONSOLE WITH STORAGE UNIT INSERT

FIELD OF THE INVENTION

The present disclosure provides for an overhead console structure and, in particular, an overhead console structure with a sunglass bin and a storage unit insert attached to the sunglass bin.

BACKGROUND OF THE INVENTION

Overhead consoles within motor vehicles are known and can include one or more components that can be used by an occupant of the motor vehicle. For example, an overhead console can have a sunglass bin that can hold a pair of glasses that can be retrieved when a driver of the motor vehicle needs or desires to wear the glasses. When the sunglass bin is in a closed position, a generally smooth surface of the overhead console is provided and the pair of glasses is held out of view from an occupant of the motor vehicle. In the alternative, an open position of the sunglass bin provides access to the pair of glasses.

With the continued development and use of portable electronic devices by individuals, there is a continuing need to hold, store, etc. such devices within a motor vehicle while an occupant travels from one location to another. In addition, some electronic devices have a visual display that can provide information to an individual, e.g. GPS location and/or instructions, identification of a caller for an incoming phone call, and the like.

Location typically associated with a sunglass bin and overhead console could be a desirable location for a portable electronic device. However, space is limited within the overhead console and thus providing a dedicated or special location for such an electronic device within the console would use limited space and/or conflict with design requirements. Therefore, a sunglass bin that is part of an overhead console that can be used to hold and/or view a portable electronic device would be desirable.

SUMMARY OF THE INVENTION

The present disclosure provides an overhead console for a motor vehicle that can firmly hold, store and allow viewing of a portable electronic device. The overhead console can include a sunglass storage bin that is pivotally attached to an overhead console storage structure, the sunglass storage bin having a closed position and an open position. The console can also include a storage unit insert that is attached to and located at least partially within the sunglass storage bin. The storage unit insert can be dimensioned to hold a portable electronic device within the sunglass storage bin and allow the device to be stored out of view when the sunglass storage bin is in the closed position and allow viewing of the electronic device when the sunglass storage bin is in the open position.

Elastomer tape and/or foam can be attached to an inner surface of the storage unit insert such that it is located between the inner surface and the portable electronic device held by the insert. The elastomer tape and/or foam can provide for secure gripping and holding of the electronic device such that vibration and/or noise is eliminated when the motor vehicle is moving.

The storage unit insert can have a generally U-shaped clip that attaches the insert to the sunglass storage bin. Furthermore, elastomer tape and/or foam can be attached to an inner surface of the generally U-shaped clip and afford for secure attachment of the storage unit insert to the sunglass storage bin.

The sunglass storage bin can have a back wall, a bottom wall, and a front wall extending from the bottom wall such that a space is provided and dimensioned to hold a pair of glasses. In addition, the storage unit insert can have a back panel, a bottom panel, and a front panel extending from the bottom panel such that an opening dimensioned to hold a portable electronic device is provided. It is appreciated that the storage unit insert can be smaller than the space of the sunglass storage bin and a spacer can be provided that extends from the back panel of the storage unit insert to the back wall of the sunglass storage bin. In this manner the storage unit insert can be held firmly within the sunglass storage bin and vibration and/or noise is prevented when the vehicle is moving.

In some instances, the U-shaped clip of the storage unit insert can be provided by a J-shaped flange extending from the front panel of the storage unit insert. The U-shaped clip can be dimensioned to slide over and onto the front wall of the sunglass storage bin with the storage unit insert attached to and located at least partially within the sunglass storage bin.

DETAILED DESCRIPTION OF THE PRESENT INVENTION

Figure 1:
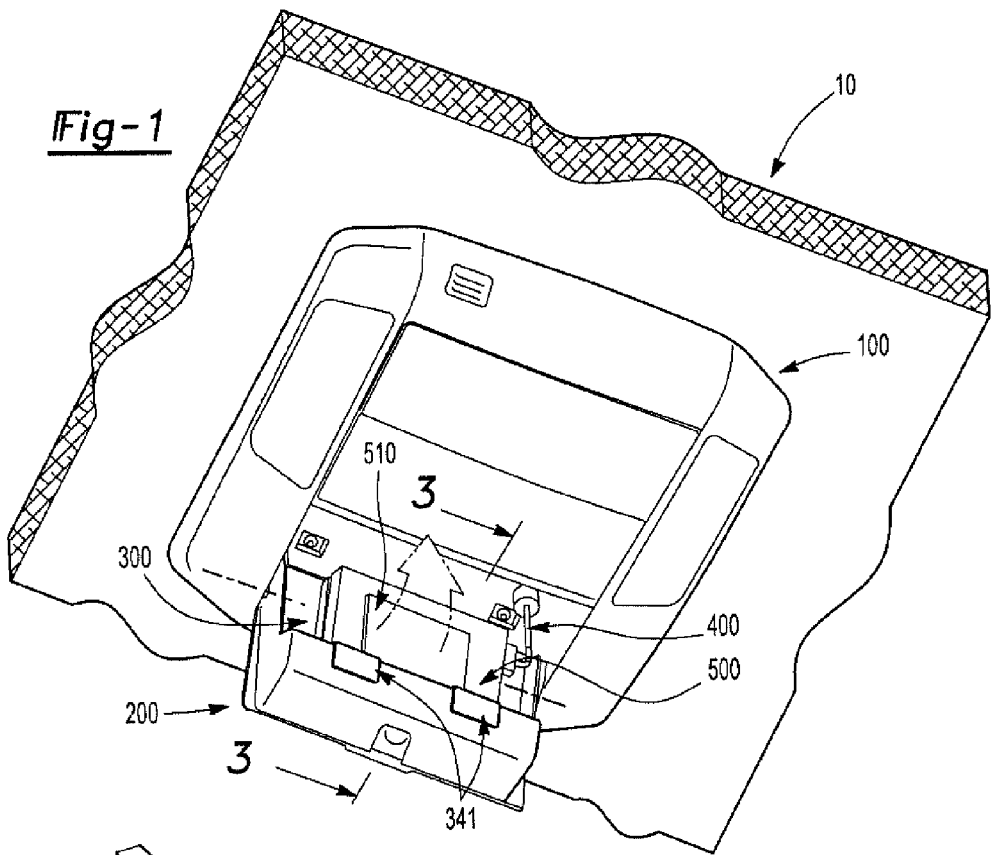
FIG. 1 is a perspective view of an illustrative storage unit insert and a portable electronic device attached to a sunglass bin in an open position.

The present disclosure provides an overhead console with a sunglass storage bin and a storage unit insert that can be attached to the sunglass storage bin. The storage unit insert can be dimensioned to firmly hold a portable electronic device. As such, the storage unit insert disclosed herein has utility as a component for a motor vehicle.

The sunglass storage bin can be pivotally attached to the overhead console and thereby be pivotal between a closed position and an open position. A pair of glasses can be stored and/or held within the sunglass storage bin, and when the bin is in the closed position a generally smooth surface of the overhead console can be provided with the glasses stored out of view from an individual sitting within the motor vehicle. In the event that the individual desires to retrieve the pair of glasses from the sunglass storage bin, the bin can be pivoted to the open position and the glasses removed therefrom.

In the event that the individual desires to use the sunglass storage bin to hold and/or store a portable electronic device, the inventive storage unit insert can be attached to and located at least partially within the sunglass storage bin as described below. The storage unit insert can be dimensioned to hold the portable electronic device such that the device can be stored out of view when the sunglass storage bin is in the closed position, and yet allow access to and viewing of the electronic device when the sunglass storage bin is in the open position.

The sunglass storage bin can have a back wall, a bottom wall, and a front wall extending from the back wall such that a space is defined and dimensioned to hold a pair of glasses as is known to those skilled in the art. The storage unit insert can have a back panel, a bottom panel, and a front panel extending from the bottom panel such that an opening is defined and dimensioned to hold a portable electronic device. Extending from the front panel of the storage unit insert can be a generally J-shaped flange that affords a U-shaped clip that will fit over and onto the front wall of the sunglass storage bin. In this manner, the storage unit insert can be attached to the sunglass storage bin and be located at least partially therewithin.

In some instances, elastomer tape and/or foam can be located on an inner surface of the back panel, bottom panel, and/or front panel of the storage unit insert such that the portable electronic device is firmly held by the storage unit insert. In addition, elastomer tape can be provided or attached to an inner surface of the generally U-shaped clip such that the storage unit insert is firmly attached to the front wall of the sunglass storage bin.

Turning now to FIGS. 1-5, an overhead console according to an embodiment disclosed herein is shown generally at reference numeral 10. The overhead console 10 can include an overhead console storage structure 100 that has a sunglass storage bin 200 and a storage unit insert 300 attached thereto. In addition, a charging cable 400 for charging a portable electronic device 500 held by the storage unit insert 300 can be provided.

The sunglass storage bin 200 can be pivotally attached to the overhead console storage structure 100 about a pivot axis 202 that affords for the bin 200 to move or pivot between a closed position and an open position. The sunglass storage bin 200 can have a back wall 210, a bottom wall 220, and a front wall 230. The back wall 210 can have a first end 212 and a second end 214 with the bottom wall 220 having a first end 222 attached to the second end 214 of the back wall 210. In this manner, the bottom wall 220 can extend from the back wall 210. Likewise, the front wall 230 can have a first end 232 that is attached to a second end 224 of the bottom wall 220 which thus affords for the front wall 230 to extend from the bottom wall 220 and provide a generally J-shaped compartment.

The back wall 210 can have a height $h_1$ and the front wall 230 can have a height $h_2$. It is appreciated from the figures that the front wall height $h_2$ is less than the back wall height $h_1$ and is spaced apart from the back wall 210 by a distance $d_1$ such that a space 240 is provided and can be used to hold, for example, a pair of glasses.

Figure 2:
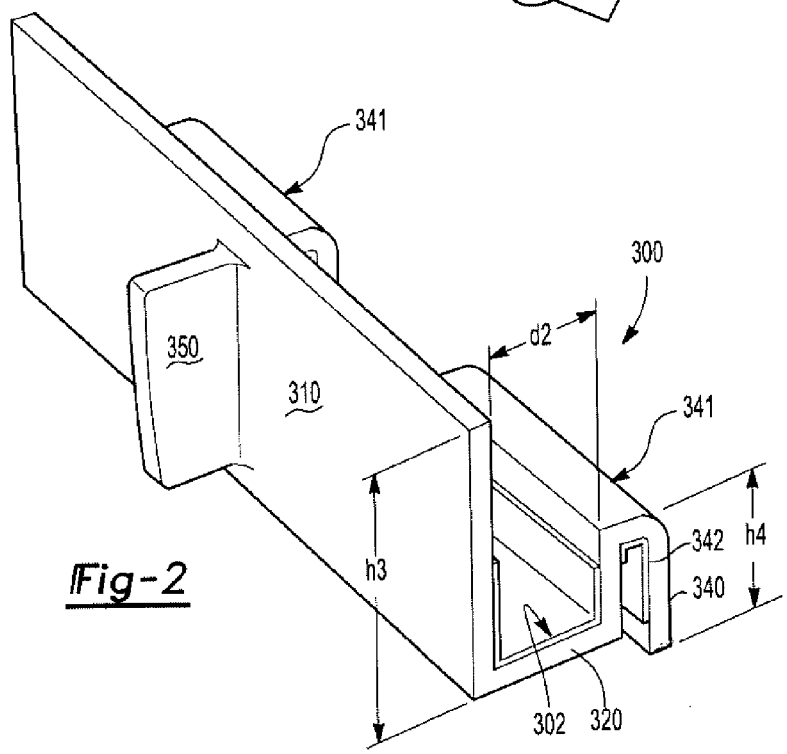
FIG. 2 is a perspective view of the illustrative storage unit insert shown in FIG. 1.
Figure 3:
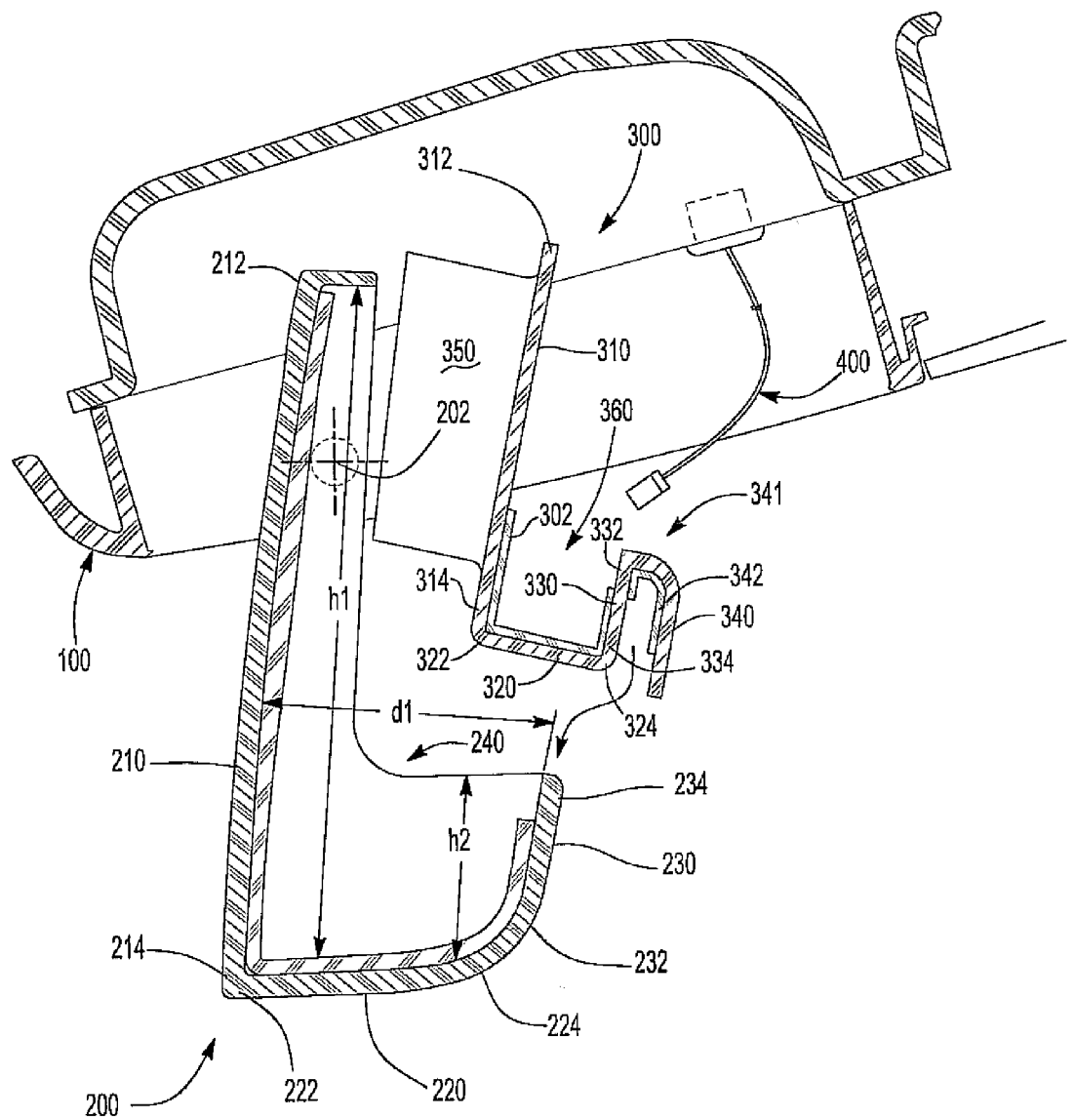
FIG. 3 is a side cross-sectional view illustrating how the storage unit insert is attached to the sunglass bin.
Figure 4:
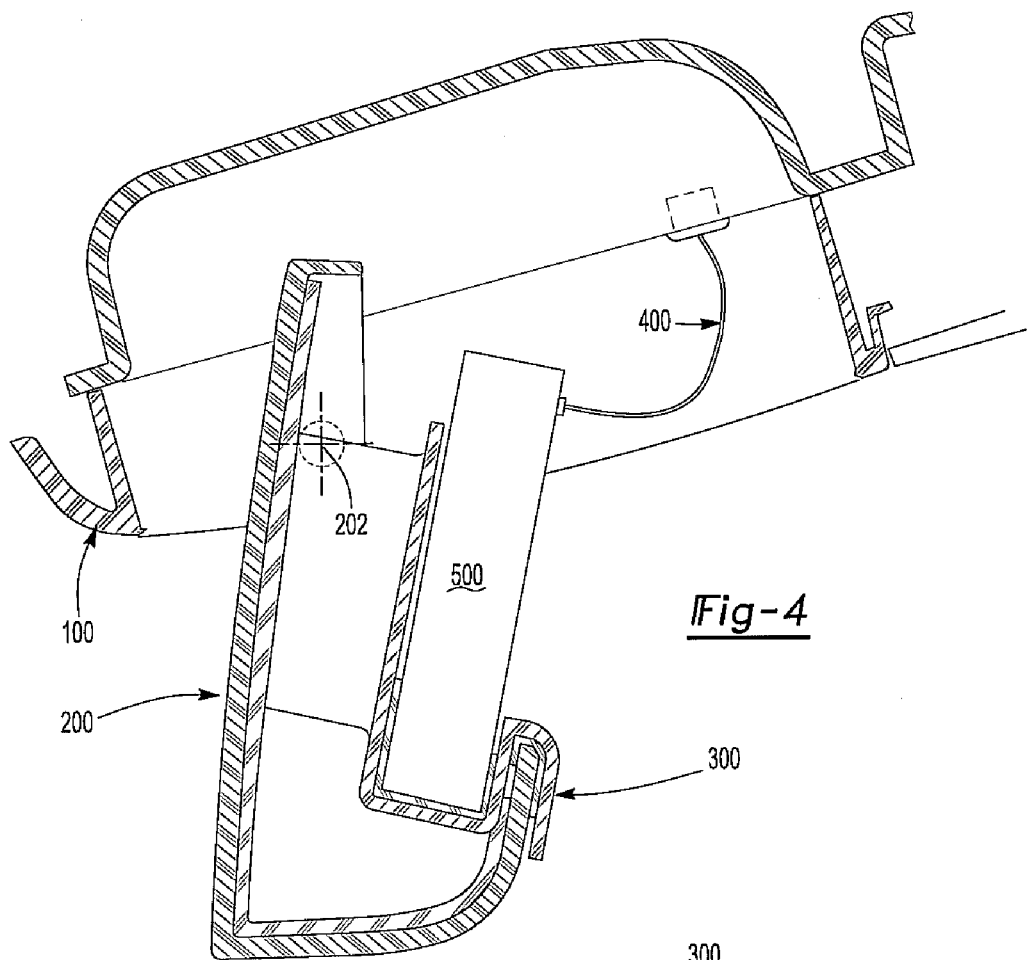
FIG. 4 is a side cross-sectional view illustrating the storage unit insert with a portable electronic device attached to the sunglass storage bin.

Looking particularly at FIGS. 2-4, the storage unit insert 300 can be attached to the front wall 230 of the sunglass storage bin 200. The storage unit insert 300 can have a back panel 310, a bottom panel 320, and a front panel 330. The back panel 310 can have a first end 312 and a second end 314, and the bottom panel 320 can have a first end 322 and a second end 324. The second end 314 of the back panel 310 can be attached to the first end 322 of the bottom panel 320, and in this manner the bottom panel 320 can extend from the back panel 310. The front panel 330 can have a first end 332 and a second end 334, the second end 334 being attached to the second end 324 of the bottom panel. In this manner, the front panel 330 can extend from the bottom panel 320.

Extending from the first end 332 of the front panel 330 can be a generally J-shaped member 340, the front panel 330 and the J-shaped member 340 providing a generally U-shaped clip 341 that can be dimensioned to fit over and onto a second end 234 of the front wall 230. In this manner, the storage unit insert 300 can be attached to the sunglass storage bin 200.

The back panel 310 of the storage unit insert 300 can have a height $h_3$. In addition, the front panel 330 can be spaced apart from the back panel 310 by a distance $d_2$ such that an opening 360 is provided and can be dimensioned such that the insert 300 can hold the portable electronic device 500. Stated differently, the opening 360 affords for the portable electronic device 500 to be slid between the back panel 310 and the front panel 330 and held therebetween.

In some instances, one or more pieces of elastomer tape 302 can be attached to an inner surface of the storage unit insert 300. For example, the elastomer tape 302 can be attached to at least one of the back panel 310, bottom panel 320, and front panel 330 as illustrated in FIG. 3. The location of the elastomer tape 302 can afford for a secure gripping and/or holding of the portable electronic device 500 as shown in FIG. 4. In addition to the elastomer tape 302 being used to hold the portable electronic device 500, one or more pieces of elastomer tape 342 can be placed or attached to an inner surface of the U-shaped clip 341 formed by the J-shaped flange 340 extending from the front panel 330. The elastomer tape 342 can thus provide for an interference fit between the front wall 230 and the J-shaped flange 340-front panel 230. The J-shaped flange 340 can have a height $h_4$.

Figure 5:
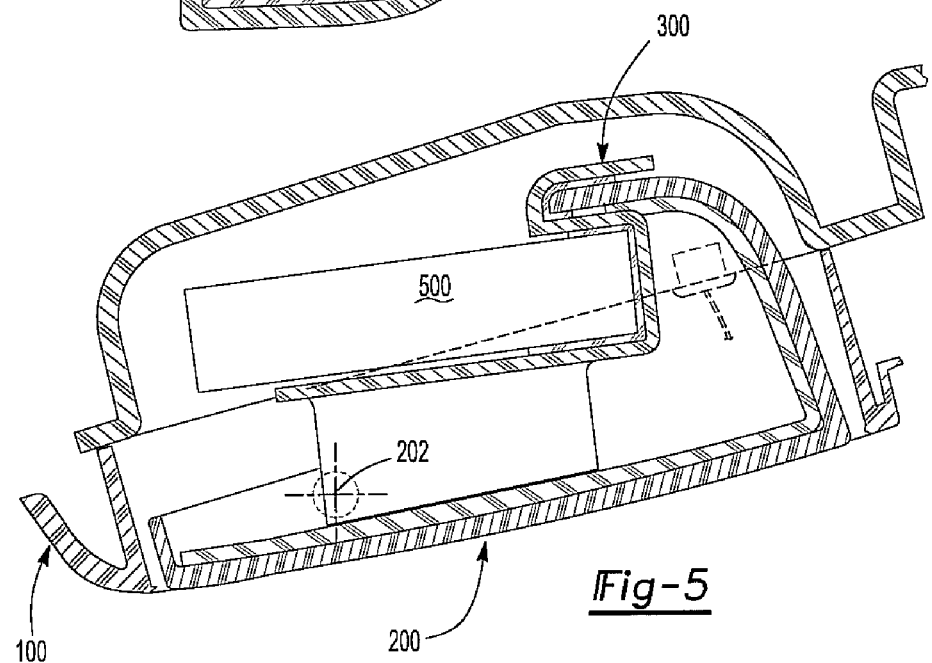
FIG. 5 is a side cross-sectional view illustrating the sunglass bin with the storage unit insert attached thereto in a closed position.

As shown in FIGS. 1, 4 and 5, the storage unit insert 300 is smaller than the sunglass storage bin 200, and as such a spacer 350 can be provided to prevent vibration between the insert 300 and the bin 200. For example, the spacer 350 can be attached to and extend from the back panel 310 to the back wall 210. In this manner, vibration, noise, rattling noise, and the like between the storage unit insert 300 and the sunglass storage bin 200 can be minimized and/or prevented. In some instances, the spacer 350 can be integral with the back panel 310. In the alternative, the spacer 350 can be attached to the back panel 310, for example using an adhesive, tape, hook and loop fastener, tongue and groove fastener and the like. In addition, the spacer 350 can be made from the same material as the back panel 310 or made from a different material, e.g. foam rubber.

In use, the storage unit insert 300 can be attached to the sunglass storage bin 200 by sliding one or more generally U-shaped clips 341 of the insert 300 over the front wall 230. With the storage unit insert firmly attached to the front wall 230, the portable electronic device 500 can be slid into the opening 360 and held firmly in place. If desired, the charging cable 400 can be connected to the portable electronic device 500 such that the device is charged while an individual is traveling from one location to another location. In some instances the charging cable 400 afford for two way communication between the portable electronic device 500 and another electronic device within the motor vehicle. For example and for illustrative purposes only, the charging cable 400 can be a Universal Serial Bus (USB) cable that affords for audio files on the electronic device 500 to be played on a stereo or sound system that is part of the motor vehicle.

The portable electronic device can have a display 510 that can be viewed by an individual in the interior of the motor vehicle when the sunglass storage bin 200 is in the open position. In this manner, the individual can view the display and determine information such as whether or not there is an incoming phone call, caller information for an incoming phone call, instructions from a GPS unit, and the like. It is appreciated that the portable electronic device 500 can be any portable electronic device known to those skilled in the art, illustratively including a cell phone, a portable media player, etc. In addition, the storage unit insert 300 can be made from any material known to those skilled in the art, illustratively including metals, polymers, ceramics, and combinations thereof. For example and for illustrative purposes only, the storage unit insert 300 can be an injected molded polymer.

It is to be understood that various modifications are readily made to the embodiments described herein without departing from the scope and spirit thereof. Accordingly, it is to be understood that the invention is not to be limited by the specific illustrated embodiment but by the scope of the claims.

We claim:

1. An overhead console for a motor vehicle comprising:
    a storage bin pivotally attached to said overhead console, said storage bin having a closed position and an open position; and
    a storage unit insert attached to and located at least partially within said storage bin, said storage unit insert dimensioned to hold an electronic device and allow viewing of the electronic device when said storage bin is in said open position, said insert having a generally U-shaped clip that attaches the insert to the storage bin
    wherein said storage bin has a back wall, a bottom wall, a front wall extending from said bottom wall defining a space dimensioned to hold glasses;
    wherein said storage unit insert has a back panel, a bottom panel, a front panel extending from said bottom panel defining an opening dimensioned for the electronic device to slide into; and
    a spacer attached to and extending from said back panel of said storage unit insert and abutting against said back wall of said storage bin.

2. The overhead console of claim 1, further comprising elastomer tape attached to an inner surface of said storage unit insert, said elastomer tape located between said inner surface and the electronic device held by said storage unit insert for the purpose of securely gripping and holding the electronic device.

3. The overhead console of claim 1, further comprising elastomer tape attached to an inner surface of said generally U-shaped clip, said elastomer tape located between said inner surface and said storage bin for the purpose of securely attaching said storage unit insert to said storage bin.

4. The overhead console of claim 1, further comprising elastomer tape attached to an inner surface of said opening, said elastomer tape located between said inner surface and the electronic device when the electronic device is slid into said opening.

5. The overhead console of claim 4, further comprising a J-shaped flange extending from said front panel and forming a U-shaped clip dimensioned to slide over and onto said front wall of said storage bin and attach said storage unit insert to said storage bin.

6. The overhead console of claim 5, further comprising elastomer tape attached to an inner surface of said U-shaped clip and located between the front wall of said storage bin and at least one of said front panel and said J-shaped flange of said storage unit insert.

7. An overhead console having a sunglass storage bin in a motor vehicle comprising:
    an overhead console storage unit;
    a sunglass storage bin pivotally attached to said overhead console storage unit and having a back wall, a bottom wall and a front wall extending from said bottom wall, said sunglass storage bin having an open position and a closed position;
    a space between said back wall and said front wall dimensioned to hold glasses;
    a storage unit insert having a back panel, a bottom panel, a front panel and a generally J-shaped clip extending from said front panel to form a generally U-shaped clip; and
    an opening between said back panel and said front panel dimensioned for an electronic device to slide into;
    said generally U-shaped clip dimensioned to slide over and onto a top end of said sunglass storage bin front wall and attached said storage unit insert at least partially within said space, for the purpose of providing an electronic device holder inside of said sunglass storage bin.

8. The overhead console of claim 7, further comprising elastomer tape attached to at least one of said back panel, bottom panel and front panel, for the purpose of securely holding and gripping an electronic device within said opening of said storage unit insert.

9. The overhead console of claim 7, further comprising elastomer tape attached to an inner surface of said generally U-shaped clip, for the purpose of securely holding said storage unit insert onto said front wall of said sunglass storage bin.

10. The overhead console of claim 7, wherein said front panel extends from said bottom panel a predetermined distance, said predetermined distance allowing a visual display of at least one of a cell phone and a portable media player to be viewed by an occupant in the motor vehicle when said sunglass storage bin is in said open position.

11. The overhead console of claim 7, further comprising a spacer between said back panel of said storage unit insert and said back wall of said sunglass storage bin, for the purpose of holding the storage unit insert firmly in place relative to said sunglass storage bin when the motor vehicle is moving.

12. The overhead console of claim 11, wherein said spacer is attached to and extends from said back panel of said storage unit insert.

* * * * *